United States Patent [19]
Anderson

[11] 3,799,687
[45] Mar. 26, 1974

[54] TOOLING FOR VALVE GUIDE RECONDITIONING

[75] Inventor: Richard T. Anderson, Owatonna, Minn.

[73] Assignee: Owatonna Tool Company, Owatonna, Minn.

[22] Filed: Feb. 9, 1972

[21] Appl. No.: 224,860

[52] U.S. Cl.................... 408/75, 408/80, 408/709
[51] Int. Cl............................................. B23b 49/00
[58] Field of Search........... 408/81, 80, 79, 75, 709, 408/82, 83

[56] References Cited
UNITED STATES PATENTS
3,157,068  11/1964  Rickert............................ 408/82 X
3,674,375  7/1972  Reed et al....................... 408/709 X

*Primary Examiner*—Gil Weidenfeld
*Attorney, Agent, or Firm*—Hofgren, Wegner, Allen, Stellman & McCord

[57] ABSTRACT

Tooling for reconditioning a valve guide in a cylinder head for an internal combustion engine having a valve seat and a coaxial valve guide in the cylinder head on an axis either inclined or at a right angle to the combustion chamber surface of the cylinder head, including a guide plate having a flat bottom surface adapted to rest on the surface of the cylinder head over the valve seat and valve guide, a bore through the guide plate on an axis at an angle to the flat bottom surface of the guide plate and at the same angle as the valve guide, a tool guide in the bore in the guide plate having a conical lower end surface engageable with the bottom edge of a valve seat in the cylinder head for laterally locating the guide plate relative to the valve seat, a flat edge along one side of the guide plate adapted to be positioned relative to the original hole machining pattern in the surface of the cylinder head to angularly locate the axis of the bore in a predetermined position relative the original machining pattern and coaxial with the valve guide, a guide bar mountable on the cylinder head adjacent one edge thereof and in relation to the original machining pattern and having a side surface coacting with the flat edge of the guide plate for angularly locating the guide plate, and means for securing the guide plate to a cylinder head in properly adjusted position.

17 Claims, 9 Drawing Figures

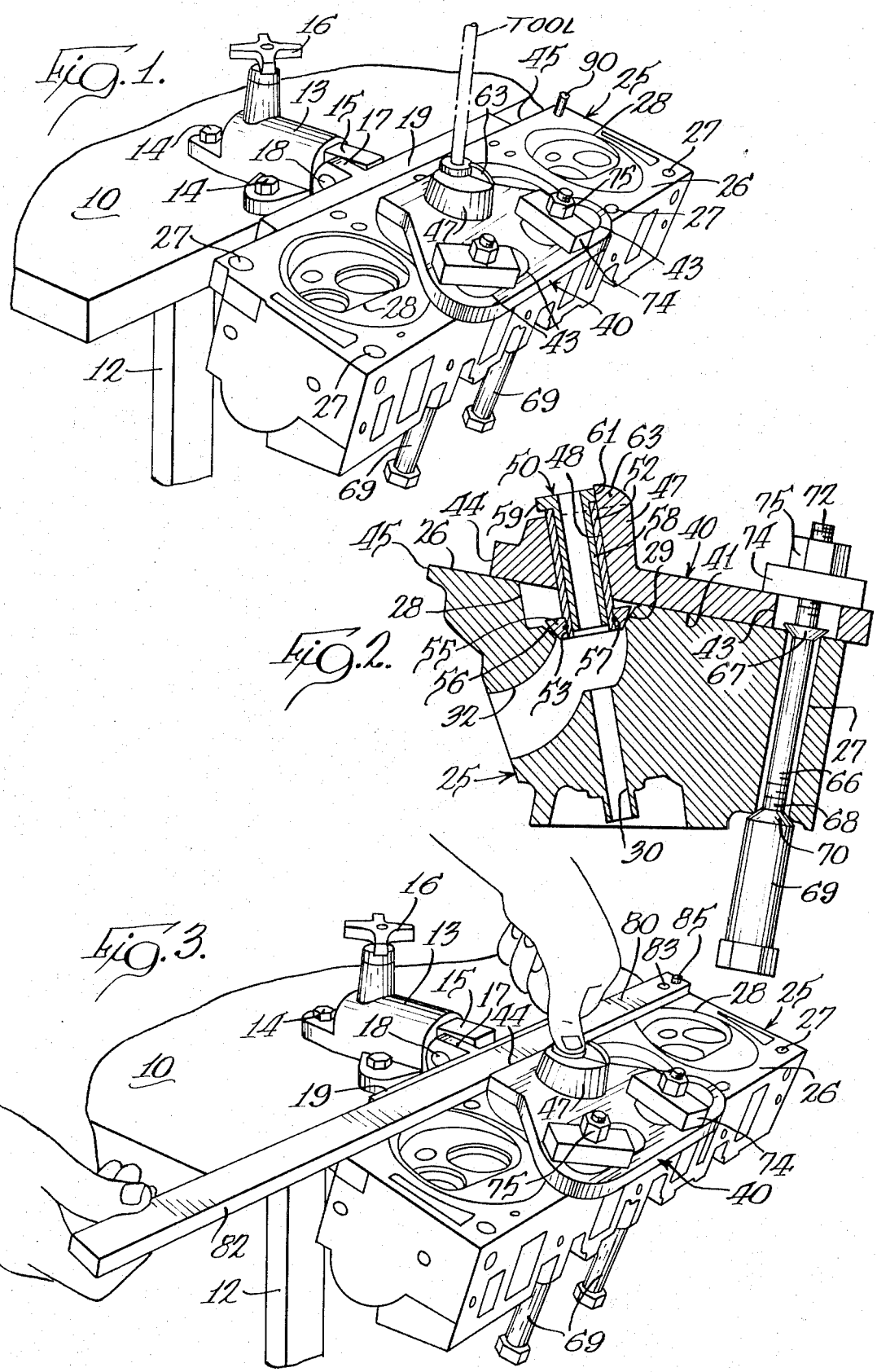

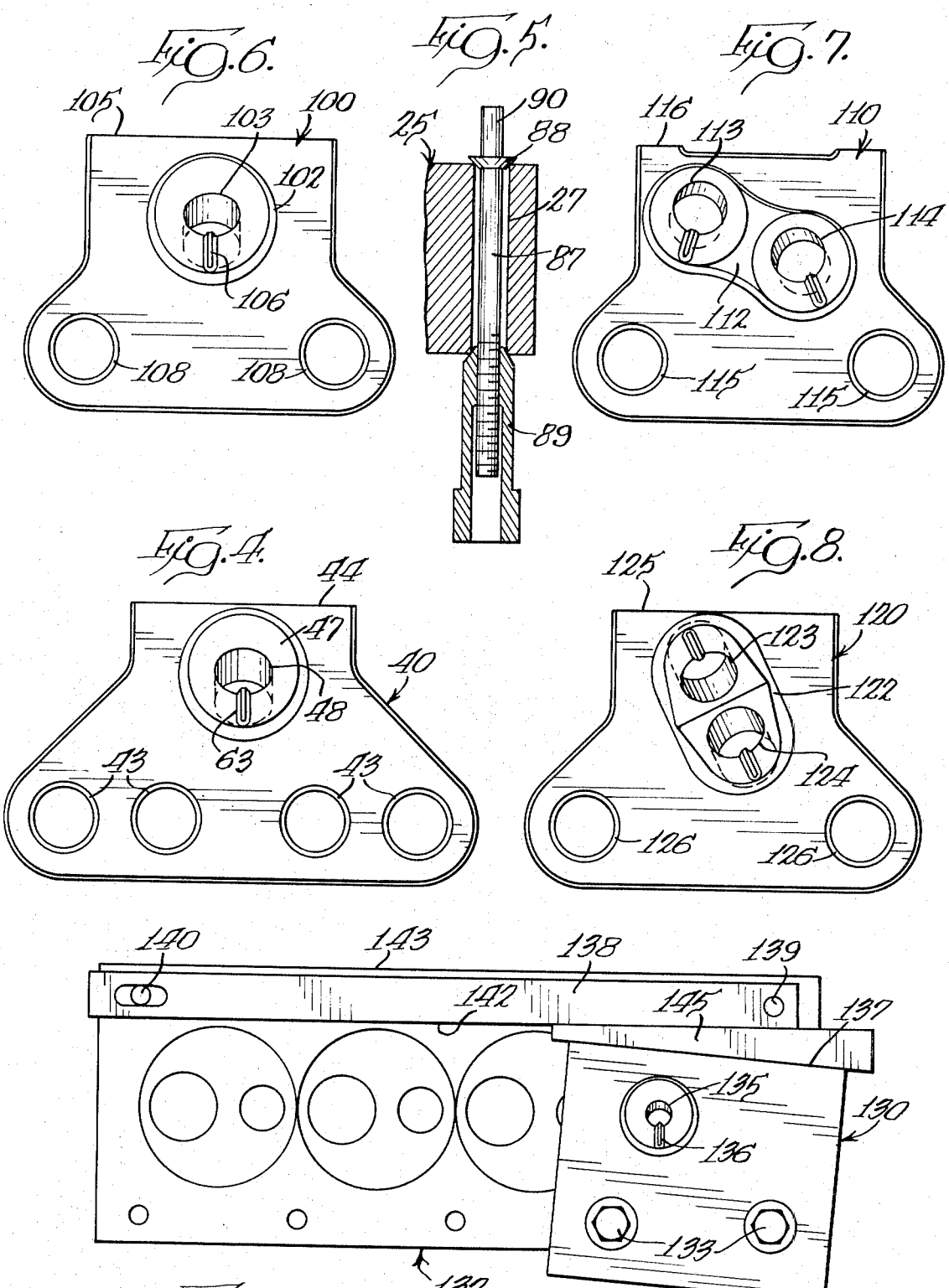

TOOLING FOR VALVE GUIDE RECONDITIONING

BACKGROUND OF THE INVENTION

The present invention relates to tooling for guiding a cutting tool for reconditioning a valve guide in a cylinder head for an internal combustion engine having a valve seat and a coaxial valve guide in the cylinder head on an axis which may be inclined relative to the combustion chamber surface of the cylinder head.

Some prior art effort has been directed toward reconditioning equipment for valve seats and valve guides. For example, U.S. Pat. No. 1,693,129 relates to a valve seat reamer, and U.S. Pat. Nos. 2,834,233 and 2,864,268 relate to valve guide reconditioning equipment, in which a support is mountable on an engine cylinder head and permits adjustment of a tool guide longitudinally along the engine head, but in each of the patents the equipment is provided for use in connection with bores which are normal to the accessible tool entry surface of the cylinder head rather than inclined relative to such surface.

Further, U.S. Pat. No. 3,034,380 relates to a jig for supporting boring equipment for use in connection with cylinder bores disposed at an angle relative to the surface of the cylinder block, but the support for the boring tool is a relatively complex adjustable skeletal framework, and the boring tool is adjustable longitudinally along such framework. U.S. Pat. No. 3,157,068 relates to an apparatus for reconditioning valve guides which are inclined relative to the combustion chamber surface of a cylinder head, but the apparatus is somewhat complex in providing for a number of adjustments to facilitate use of the device in connection with a number of different arrangements, so that a relatively high degree of skill would apparently be required in properly setting the apparatus up for use in a given situation.

SUMMARY OF THE INVENTION

The present invention is directed toward the provision of a relatively simple tooling for reconditioning a valve guide with a centerline on an axis which may be inclined relative to the top surface of the cylinder head.

The tooling of the present invention includes a guide plate having a flat bottom surface adapted to rest on the combustion chamber surface of the cylinder head over a valve seat and a coaxial valve guide in the head, a bore through the guide plate on an axis at an angle to the flat bottom surface of the guide plate which is the same as that of the valve guide for receiving a tool, a flat edge along one side of the guide plate adapted to be positioned relative to the original machining pattern of the cylinder head to angularly locate the axis of the bore in a predetermined position coincident with the axis of the original valve guide bore, and means for securing the guide plate to a cylinder head in properly adjusted position.

Preferably, the tooling includes a tool guide in the bore in the guide plate provided with a conical lower end surface positionable against the bottom of a valve seat in the cylinder head for laterally locating the plate relative to the valve seat.

In the preferred construction illustrated herein, the tool guide includes an outer guide sleeve having a reduced lower end defining a shoulder on the outer surface of the sleeve, a collar on the reduced end of the sleeve engaging the shoulder thereon and having an outer lower conical surface with an included angle less than that of the valve seat engageable with the bottom of the valve seat, and an inner tool guide bushing positioned in the sleeve and having an outwardly extending annular flange at the top end thereof engaging the end of the sleeve.

In order to properly orient the guide plate tool guide coincident with the axis of the valve guide, structure is mountable on the top of the cylinder head in a predetermined position relative to original holes machined in the head and coacts with the flat edge of the guide plate for angularly locating the guide plate.

BRIEF DESCRIPTION OF THE DRAWINGS

FIG. 1 is a perspective view of a fragmentary portion of a work support bench with a work supporting fixture holding an inverted cylinder head of an internal combustion engine and with part of the tooling according to the present invention mounted on the head;

FIG. 2 is a transverse sectional view through the cylinder head and the tooling illustrated in FIG. 1;

FIG. 3 is a perspective view similar to FIG. 1, demonstrating the manner in which the guide plate is properly located on the cylinder head preparatory to being secured thereon;

FIG. 4 is a top plan view of the guide plate utilized in the device illustrated in FIGS. 1-3;

FIG. 5 is a fragmentary sectional view through the cylinder head illustrating the manner of mounting a pivot pin for the guide bar illustrated in FIG. 3;

FIG. 6 is a top plan view of a guide plate different from that illustrated in FIG. 4;

FIG. 7 illustrates another guide plate;

FIG. 8 illustrates still an additional guide plate; and

FIG. 9 is a plan view of a cylinder head and a second embodiment of tooling embodying the principles of the present invention.

DETAILED DESCRIPTION OF PREFERRED EMBODIMENT

Referring now to the drawings in more detail, the invention is illustrated in connection with a work bench or table including a table top as at 10 and a leg structure illustrated in part at 12. The table top has a work supporting fixture mounted thereon which includes a tubular housing as at 13 appropriately secured to the table top as by bolts or screws 14. At rotatable shaft 15 is mounted in the housing 13 and adapted to be secured in angularly adjusted positions by a manually accessible plunger 16 adapted to engage appropriate detent recesses angularly spaced around the periphery of the shaft. The outer exposed end of the shaft 15 has a bracket 17 adapted to be secured in adjusted position about a pivot axis 18 and carrying a transversely extending elongated work supporting bar 19.

The mounting bar is adapted to support a cylinder head such as that illustrated at 25 from which the manifold has been removed so as to expose mounting holes on the rear of the head as viewed in FIGS. 1 and 3 accessible for bolts or screws (not visible) securing the cylinder head to the mounting bar 19. As illustrated in FIGS. 1, 2 and 3, the cylinder head has been removed from the cylinder block and inverted to present a generally horizontally disposed upper surface 26 which is substantially flat and planar and contains originally machined recesses therein for various purposes, including bolt holes which extend completely through the head as at 27, and recesses at 28 each a part of a combustion chamber when the engine is entirely assembled.

Referring to FIG. 2, it will be noted that the recess 28 includes a valve seat 29 of conical configuration and an aligned coaxial valve stem guide bore 30 which lie on an axis which is inclined relative to the top surface 26 of the cylinder head. In normal use, the valve seat 29 is adapted to accept an intake or exhaust valve disc with a conically shaped outer periphery and a longitudinally extending stem disposed in the bore 30. The valve seat 29 communicates with a passage 32 leading to an appropriate manifold. In use of the automobile engine including the head 25 over extended periods of time, wear occurs in the valve stem guide bore 30, making it desirable to recondition the valve bore in a manner to accept a larger valve stem or in a manner to accept a bushing which will provide an appropriate bore for guiding the valve stem. The present invention provides a guide device for purposes of guiding a cutting tool such as a drill bit or a reaming bit for reconditioning the surface of the bore 30.

As illustrated in FIGS. 1-3, the tooling includes a guide plate 40 of somewhat triangular configuration having a machined flat bottom surface 41 adapted to rest on the exposed combustion chamber surface 26 of the cylinder head 25. The guide plate is formed with a plurality of apertures 43, four as illustrated in FIGS. 1-4, arranged along one edge to facilitate attachment of the plate to the cylinder head. Remote from the row of apertures 43, the guide plate 40 is formed with a flat vertical edge 44 disposed adjacent the back edge 45 of the head and properly machined to provide a smooth guide surface for use in angularly aligning the guide plate 40 relative to the original machining or hole pattern of a cylinder head. The top surface of the guide plate 40 includes an upstanding boss 47, and a bore 48 extends through the boss and the guide plate on an axis inclined at an angle relative to the bottom surface of the plate. This angle duplicates the angle of the valve guide bore relative to the head surface and which may be either normal or inclined to said surface.

In order to utilize the guide plate 40 with a refinishing tool, a tool guide assembly is inserted into the bore 48. As illustrated, the tool guide assembly 50 includes an outer sleeve 52 positionable in the bore 48 and having a reduced lower end portion 53 forming a shoulder facing downwardly at the juncture between the reduced portion of the main portion of the sleeve. The reduced portion of the sleeve 52 is adapted to removably receive any of a plurality of different collars, one of which is illustrated at 55, abutting the shoulder on the sleeve and including a conically shaped end 56 adapted to penetrate the conically shaped valve seat 29. The conical end 56 has an included conical angle somewhat less than the included conical angle of the valve seat to engage the bottom of the valve seat. This locates the collar at the location of least wear on the valve seat. The reduced end portion of the sleeve 52 has a surrounding groove carrying an O-ring 57 of resilient material which frictionally removably holds the collar. An inner tool guide bushing 58 is positioned in the sleeve 52 and includes an outwardly extending annular flange at the upper end engaging the upper end of the sleeve 52. In order to prevent rotation of the tool guide assembly in the bore 48, the annular flange 59 is formed with a peripheral notch or recess as at 61 adapted to receive a projecting detent 63 on the upper surface of the boss 47 adjacent the bore 48.

In order to secure the guide plate 40 to the cylinder head 25, the cylinder head bolt holes 27 are adapted to receive a pair of elongated bolts as at 66 each having a conically shaped head 67 near the upper end of the bolt, and a threaded lower end portion 68. The threaded portion 68 is adapted to receive an elongated nut 69 having a conical upper end portion 70 receivable in the bolt hole 27 in a manner to center and secure the bolt in the bolt hole with the aid of head 67. When the nut 69 is tightened, and the bolt is secured in place, an upper threaded end portion 72 is adapted to project through one of the mounting apertures 43 in the guide plate 40. The guide plate 40 is secured in position by a clamp plate 74 on the bolt portion 72, bearing against the plate 40 and secured by a nut 75.

In order to properly rotationally align the guide plate 40 before it is securely fastened in place on the cylinder head, a guide bar 80 is utilized. The bar 80 is an elongated member having a generally rectangular cross sectional configuration and formed with a flat machined side surface at 82 adapted to engage the flat edge 44 on the plate 40. As illustrated in FIG. 3, the bar 80 is formed with an aperture 83 and an adjacent upstanding pivot pin 85. The bar 80 may be pivotally mounted by inserting the pivot pin 85 into one of the bolt holes 27 in some of the cylinder head constructions. In other constructions, such as that illustrated herein, the aperture 83 is utilized to pivotally mount the bar on a pivot pin appropriately secured in one of the bolt holes as at 27. Referring to FIG. 5, a pivot bolt 87 has a conically shaped head 88 and a conically shaped nut 89 adapted to secure the bolt in place, while leaving an upwardly projecting smooth end portion 90 forming a pivot pin positionably in the recess 83 in the bar 80.

In utilizing the tooling, bolts 66 are secured in place by tightening the nuts 69. A guide plate having a bore with an angle duplicating that of the valve guide, is chosen for use in connection with the particular cylinder head 25 which is to be reconditioned. At the same time, an appropriate tool guide assembly 50 is selected. The same outer sleeve 48 is used at all times. An appropriate collar 55 is positioned on the outer sleeve 48 and frictionally retained thereon by the O-ring 57. The outer sleeve is inserted into the guide plate bore 48 from the bottom, and the plate is positioned on the cylinder head with the collar 55 in the valve seat 29. An appropriate inner tool guide bushing 58 is inserted into the outer sleeve 52. In positioning the guide plate 40, the projecting end portions of the bolts 72 are located in recesses 43. The clamp plates 74 and the nut 75 may be loosely tightened so that the guide plate 40 is free to be adjusted properly. The guide bar 80 is pivotally mounted on the pivot pin 90, and as illustrated in FIG. 3, the guide plate is laterally positioned by manually pressing firmly on the top of the annular flange 59 on the inner tool guide bushing 58 so that the conical collar 55 becomes centered in the bottom of the conical valve seat 29. While the bushing 58 is held as described, the guide bar 80 is pivoted about the pivot pin 83 in a manner to bring the flat side surface 82 into contact with the flat edge surface 44 on the plate 40, whereupon the guide plate is rotated sufficiently that the side surface 82 on the guide bar and the edge surface 44 on the guide plate are parallel and interengaged throughout the length of the surface 44 on the plate. In this manner, the guide plate 40 is properly angularly oriented relative to the pattern of bolt holes in the cylinder head and relative to the axis of the valve guide 30 so that the axis of the tool guide is aligned with the axis of the valve guide bore.

At this time, the nuts 75 on the clamp bolts 66 may be tightened to secure the plate 40 in the properly adjusted position.

In connection with the reconditioning of valve guides where the valve guide is perpendicular to the combustion chamber surface of the cylinder head, and a tool guide is perpendicular to such surface, it is a relatively simple matter to properly align the tool guide and the valve guide simply by bringing the tool guide into register with the valve seat. In cylinder heads where the axis of the valve guide is inclined relative to the combustion chamber surface of the cylinder head, it is necessary to bring the guide plate bore into register with the upper end of the valve seat and to angularly orient the guide plate to properly align the axis of the guide plate bore with the axis of the valve stem guide bore. If the guide plate is angularly twisted from the proper position, the axis of the bore 48 in the guide plate will be angularly inclined relative to the axis of the valve guide 30 even though the lower end of the tool guide may be in register with the valve seat. Proper orientation of the axis of the bore 48 in the guide plate which duplicates the angle of the valve guide stem guide bore, is obtained by locating such axis in a predetermined relationship to the side edge 44 of the guide plate and then aligning the side edge with the side surface of the guide bar 80.

When the guide plate 40 is properly oriented and the clamp nuts 75 are tightened, the valve stem guide bore 30 may be reconditioned in an appropriate manner. In a typical reconditioning operation, the bore is first drilled with an appropriate drill bit for purposes of slightly enlarging the bore while providing a new surface. Following the drilling step, the bushing 58 used for the drill bit is removed and another bushing is positioned for guiding a reaming tool. The reaming step is then completed to properly finish the new surface of the bore 30. After the reaming step is complete, the guide bushing 58 for the reaming tool is removed and the head is inverted to mill off a portion of the material surrounding the lower end of the bore 30 if desired. With the head again in the upright position as illustrated in FIGS. 1-3, a repair bushing is driven into place in the new bore 30 with an appropriate driver and hammer. Once the repair bushing is in place, the bore through such bushing is appropriately drilled and reamed to complete the reconditioning operation. All of the reconditioning is accomplished in a valve guide bore, with one setting of the plate 40. If desired, other reconditioning tools may be utilized such as broaching and boring tools, or a combination drill-reamer, for example.

It should be understood that it is contemplated there will be a plurality of guide plates as at 40, appropriately formed for use with engines of various different manufacturers where the valve bores are of different sizes and at different locations and different inclinations. Similarly, because of the different sizes of the valve seats and valve guides, there will be a plurality of collars 55 and a plurality of tool guide bushings 58.

FIGS. 6, 7 and 8 illustrate various alternative constructions of guide plates adapted for use with various different cylinder heads in lieu of the plate 40. In FIG. 6, there is a plate 100 having a single upstanding boss 102 with a single bore 103 extending through the boss and the guide plate on an axis inclined upwardly toward the flat side edge 105 on the guide plate to duplicate the angle of the valve stem guide bore. A detent 106 is provided on the top of the boss for retaining the tool guide outer sleeve against rotation, and the guide plate is provided with two mounting apertures 108 rather than four as illustrated in FIG. 4.

In FIG. 7, a guide plate 110 is formed with an upstanding elongated boss 112 having two different bores 113 and 114 extending therethrough, both at compound angles relative to the flat side edge 116 to duplicate the angles of two valve stem guide bores. That is, the axis of each of the bores 113 and 114 is inclined not only upwardly toward the edge surface 116, but also in a direction longitudinally of the edge surface 116. Further, the angle of inclination of each bore is different from that of the other. The guide plate 110 includes a pair of mounting apertures as at 115. There is a separate alignment procedure required for the use of each of the bores 113 and 114.

In FIG. 8, a guide plate 120 has an upstanding elongated boss 122 with a pair of bores 123 and 124 therethrough, both inclined at compound angles relative to a guiding edge surface 125. In this arrangement, the two bores are inclined upwardly toward each other and relative to the side edge 125. Mounting apertures 126 facilitate attachment of the plate to a cylinder head. Again, separate alignment procedures are required for the use of each bore.

Referring to the embodiment of FIG. 9, a guide plate 130 is secured to an engine cylinder head 132 by means of mounting bolts 133. The plate includes a single upstanding boss 134 including a bore 135 on an axis inclined relative to the bottom surface of the plate 130. The top surface of the boss 134 is formed with a detent rib 136 adapted to prevent rotation of the tool guide and the bore 135.

In order to properly angularly orient the guide plate 130 on the top surface of the cylinder head, the guide plate is formed with a flat back edge surface 137 adapted to coact with an aligning bar 138 attached to the cylinder head. As illustrated, the aligning bar 138 is mounted on a pin 139 at one end, and on a pin 140 at the opposite end so that the bar is stationary on the top surface of the head with an edge surface 142 located in a predetermined position relative to the cylinder head hole pattern receiving the pins 139 and 140. The guide surface 137 on the back edge of the guide plate 130 is inclined relative to the line extending between the apertures receiving the mounting bolts 133, at an appropriate angle, on the order of 5° as illustrated. The angle between the surface 137 on the guide plate 130 and the surface 142 on the bar 138 permits insertion of a wedge member 145 which is movable longitudinally into the gap in a manner to intimately engage both the surface 137 and the surface 142. At that time, the guide plate 130 is properly angularly oriented and the bolts 133 may be tightened to hold the guide plate in place. While the illustration in FIG. 9 has omitted a showing of the tool guide in the bore 135 for purposes of simplicity, it will be understood that the bore 135 is adapted to receive a tool guide assembly similar to that described in connection with the embodiment of FIGS. 1–5.

The guide plate 130 may have any desired arrangement of bores as shown in the examples of FIGS. 7 and 8.

The tooling has versatility in use with many different heads and it has been found that seven different guide plates with specific bore arrangements will service 33 different heads of one auto manufacturer produced in the last 12 years.

I claim:

1. Tooling for reconditioning a valve guide in a cylinder head for an internal combustion engine, comprising,
   a. a guide plate having a flat bottom surface adapted to rest on the surface of a cylinder head over the valve seat and a valve stem guide bore in the head,
   b. a bore through the guide plate on an axis duplicating the angle of the valve stem guide bore relative to the cylinder head surface for receiving a tool,
   c. a tool guide fitted in the bore in the guide plate having a conical lower end surface positionable against the bottom of the valve seat in the cylinder head for accurately locating the guide plate relative to the valve seat,
   d. a flat edge along one side of the guide plate adapted to be positioned relative to the original machining pattern in the cylinder head to angularly locate the axis of the bore coaxial with the valve stem guide bore, and
   e. means attachable to the cylinder head and cooperable with said flat edge for rotatably orienting said guide plate to an aligned position with said bores aligned.

2. Tooling as defined in claim 1, wherein said orienting means includes a guide bar pivotally mountable relative to an original hole in the cylinder head and having a side surface engageable with the flat edge of the plate for angularly locating the guide plate when the side surface and flat edge are engaged and parallel.

3. Tooling as defined in claim 1, wherein said orienting means includes a guide bar mountable relative to an original hole pattern in the cylinder head and having a side surface, and a wedge positionable on the surface of the cylinder head and having opposed edges respectively engageable with the side surface of the guide bar and the flat edge of the guide plate for angularly locating the plate.

4. Tooling for reconditioning a valve guide in a cylinder head for an internal combustion engine, comprising,
   a. a guide plate having a flat bottom surface adapted to rest on the surface of a cylinder head over the valve seat and a valve stem guide bore in the head,
   b. a bore through the guide plate on an axis duplicating the angle of the valve stem guide bore relative to the cylinder head surface for receiving a tool,
   c. a tool guide in the bore in the guide plate having a conical lower end surface positionable against the bottom of the valve seat in the cylinder head for accurately locating the guide plate relative to the valve seat,
   d. a flat edge along one side of the guide plate adapted to be positioned relative to the original machining pattern in the cylinder head to angularly locate the axis of the bore coaxial with the valve stem guide bore, and
   e. means for rotatably orienting said guide plate to an aligned position with said bores aligned,
   f. said tool guide comprising an outer guide sleeve positionable in the bore in the plate and having a collar at the lower end with a conical end with an included angle less than the included conical angle of the valve seat to engage the bottom edge of the valve seat, and an inner tool guide bushing positioned in the sleeve, and having an annular flange at the upper end engaging the end of the sleeve.

5. Tooling as defined in claim 1, including cooperating means on the tool guide and the guide plate for preventing rotation of the tool guide.

6. Tooling as defined in claim 1, including means for securing the guide plate to a cylinder head in properly adjusted position.

7. Tooling for reconditioning a valve guide in a cylinder head for an internal combustion engine, comprising,
   a. a guide plate having a flat bottom surface adapted to rest on the combustion chamber surface of a cylinder head over a valve seat and a valve stem guide bore in the head on an axis at an angle to the surface of the cylinder head,
   b. a bore through the guide plate on an axis at an angle to the flat bottom surface of the plate and duplicating said angle for the valve stem guide bore for receiving a tool,
   c. a flat edge along one side of the guide plate adapted to be positioned relative an original machined recess in the surface of the cylinder head to have the axis of the bore coaxial with the axis of the valve stem guide bore,
   d. a tool guide in the bore in the guide plate having a conical lower end surface positionable in a valve seat in the cylinder head for laterally locating the guide plate relative to the valve seat,
   e. a guide bar mountable on the surface of the cylinder head relative to said original machined recess thereof having a side surface coacting with the flat edge of the guide plate for angularly locating the guide plate, and
   f. means for securing the guide plate to a cylinder head in properly adjusted position.

8. Tooling as defined in claim 7, wherein the guide bar is pivotally mountable relative to a hole in the cylinder head and pivotally engageable with the guide plate for locating the guide plate when the side surface of the bar and the flat edge of the guide plate are engaged and parallel.

9. Tooling as defined in claim 8, wherein the side surface of the guide bar is positionable adjacent one edge of the surface of the cylinder head.

10. Tooling as defined in claim 7, including means for securing the guide bar to the cylinder head, and a wedge positionable between the side surface of the bar and the flat edge of the plate to angularly locate the plate.

11. Tooling as defined in claim 7, including cooperating means on the tool guide and the guide plate for preventing rotation of the guide.

12. Tooling as defined in claim 7, wherein the tool guide comprises an outer guide sleeve having a reduced lower end defining a shoulder on the outer surface of the sleeve, a collar on the reduced end of the sleeve engaging the shoulder thereon and having an outer lower conical surface shaped to engage with the bottom edge of a valve seat in a cylinder head, and an inner tool guide bushing positioned in the sleeve and having an outwardly extending annular flange at the top end thereof engaging the end of the sleeve.

13. Tooling as defined in claim 12, including means removably retaining the collar on the sleeve.

14. Tooling as defined in claim 12, including a detent on the guide plate engaging a recess in the flange on the bushing to prevent rotation of the tool guide.

15. Tooling for reconditioning a valve guide in a cylinder head for an internal combustion engine, comprising,
   a. a set of guide plates each having a flat bottom surface adapted to rest on the combustion chamber surface of a cylinder head over a valve seat and a valve stem guide bore in the head at an angle inclined relative to the top surface of the cylinder head,
   b. each guide plate having an upstanding boss on the upper surface thereof,
   c. each guide plate having an elongate cylindrical bore through the guide plate and the boss at an angle inclined to the flat bottom surface of the plate and with the angle varying in said set of guide plates in order to selectively provide a plate duplicating the angle of the valve stem guide bore for receiving a tool,
   d. an elongate cylindrical tool guide sleeve engageable along its length in any one of said guide plates cylindrical bores for rigid positioning with said guide plate and having a conical surface beneath the plate engageable with a valve seat and having a central aperture therethrough concentric with said guide plate bore for passage of a tool,
   e. each guide plate having a flat edge along one side thereof adapted to be positioned relative to a machined surface of the cylinder head to angularly locate the guide plate bore in a predetermined position relative to said machined surface, to align said bores in coaxial relation, and
   f. means for securing the guide plate to a cylinder head.

16. Tooling as defined in claim 15, wherein the axis of the guide plate bore is inclined upwardly toward said flat edge.

17. Tooling as defined in claim 15, wherein said guide plate has a pair of bores at different angles relative to said flat edge.

* * * * *